(12) United States Patent
Wang et al.

(10) Patent No.: US 9,402,076 B2
(45) Date of Patent: Jul. 26, 2016

(54) VIDEO BUFFERING OPERATIONS FOR RANDOM ACCESS IN VIDEO CODING

(71) Applicant: QUALCOMM Incorporated, San Diego, CA (US)

(72) Inventors: Ye-Kui Wang, San Diego, CA (US); Adarsh Krishnan Ramasubramonian, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/089,495

(22) Filed: Nov. 25, 2013

(65) Prior Publication Data

US 2014/0192882 A1    Jul. 10, 2014

Related U.S. Application Data

(60) Provisional application No. 61/749,820, filed on Jan. 7, 2013.

(51) Int. Cl.
| | |
|---|---|
| *H04N 7/12* | (2006.01) |
| *H04N 7/32* | (2006.01) |
| *H04N 19/187* | (2014.01) |
| *H04N 19/169* | (2014.01) |
| *H04N 19/70* | (2014.01) |

(Continued)

(52) U.S. Cl.
CPC ........... *H04N 19/107* (2014.11); *H04N 19/433* (2014.11); *H04N 19/70* (2014.11)

(58) Field of Classification Search
CPC ............. H04N 7/12; H04N 7/26; H04N 7/32; H04N 19/30; H04N 19/59; H04N 19/70; H04N 19/169; H04N 19/187; H04N 19/597

USPC .......................................................... 375/240
See application file for complete search history.

(56) References Cited

U.S. PATENT DOCUMENTS

| | | | |
|---|---|---|---|
| 2004/0047423 A1 | 3/2004 | Viscito et al. | |
| 2013/0107953 A1* | 5/2013 | Chen ..................... | H04N 19/70 375/240.12 |

(Continued)

FOREIGN PATENT DOCUMENTS

WO     2013004911 A1    1/2013

OTHER PUBLICATIONS

Joint Collaborative Team on Video Coding (JCT-VC) Wang, JCT-VC of ITU-T SG 16 WP 3 and ISO/IEC JTC 1/SC 29/WG 11 10th Meeting: Stockholm, SE, Jul. 11-20, 2012 Document: JCTVC-J0107 AHG9: on Rap pictures.*

(Continued)

*Primary Examiner* — Sath V Perungavoor
*Assistant Examiner* — Patricia I Young
(74) *Attorney, Agent, or Firm* — Shumaker & Sieffert, P.A.

(57) ABSTRACT

A system and method for processing video data having a first random access point (RAP) picture. An access unit having a first random access point (RAP) picture is received in a video bitstream. A subsequent access unit having a RAP picture that does not initialize the hypothetical reference decoder (HRD) is also received and, based on one or more random access skipped leading (RASL) pictures for the subsequent access unit not being present in the video bitstream, a picture buffer removal time for a picture buffer is shifted earlier based on a picture buffer removal delay offset.

55 Claims, 5 Drawing Sheets

(51) Int. Cl.
  *H04N 19/597* (2014.01)
  *H04N 19/30* (2014.01)
  *H04N 19/59* (2014.01)
  *H04N 19/107* (2014.01)
  *H04N 19/433* (2014.01)

(56) References Cited

U.S. PATENT DOCUMENTS

| | | | | |
|---|---|---|---|---|
| 2014/0003536 A1* | 1/2014 | Wang | ............. | H04N 19/00 375/240.25 |
| 2014/0086336 A1* | 3/2014 | Wang | ............. | H04N 19/70 375/240.26 |

OTHER PUBLICATIONS

Bross B., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v9, 12th Meeting: Geneva, CH, Jan. 14-23, 2013, 332 pages.

Bross B., et al., "High Efficiency Video Coding (HEVC) text specification draft 9 (SoDIS)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16 ), No. JCTVC-K1003, Oct. 21, 2012, 281 Pages, XP030113269, figures 7-1 Sections 0.2, 0.3, 3, 7.4.1, 7.4.2.5.

Taiwan Office Action and Search Report—Taiwan Application No. 102145200—TIPO—Dec. 3, 2015 (1212-456TW01/131205TW) (17 pages).

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27- May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Itu-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

Chen et al., "AHG15: Conforming bitstreams starting with CRA pictures", JCT-VC Meeting; MPEG Meeting; Nov. 21-30, 201; Geneva; (Joint Collaborative Team on Video Coding of ISO/IEC JTC1/SC29/WG11 and ITU-T SG. 16); URL: http://wftp3.itu.int/av-arch/jctvc-site/, No. JCTV-G319, Nov. 9, 2011, XP030110303, 6 pp.

High-Level Syntax & Functionality, Presentation, Electronics and Telecommunications Research Institute, Online; Retrieved from the Internet on Nov. 22, 2012, 38 pp.

International Search Report and Written Opinion from the International Application PCT/US2013/072086, dated Apr. 7, 2014, 13 pp.

JCT-VC & Video, "Text of ISO/IEC 23008-2:201x/PDAM1 Range Extensions," International Organization for Standardization Organisation Internationale De Normalisation ISO/IEC JTC1/SC29/WG11 Coding of Moving Pictures and Audio, ISO/IEC JTC1/SC29/WG11 N13345, Jan. 2013, Geneva, Switzerland, 313 pp.

Wang, "AHG9: On CRA and BLA pictures", JCT-VC Meeting: MPEG Meeting; Oct. 18-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0122, XP030113004, 3 pp.

Second Written Opinion from International Application PCT/US2013/072086, dated Dec. 19, 2014, 8 pp.

International Preliminary Report on Patentability from International Applicaiton PCT/US2013/072086, dated Apr. 8, 2015, 10 pp.

* cited by examiner

VIDEO BUFFERING OPERATIONS FOR RANDOM ACCESS IN VIDEO CODING

This application claims the benefit of U.S. Provisional Application No. 61/749,820, filed Jan. 7, 2013, the entire content of which is incorporated herein by reference.

TECHNICAL FIELD

This disclosure relates to video coding, and more particularly to techniques for controlling video buffering operations of a video decoder.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction utilizes a predictive block. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for controlling buffering operations in a video decoder for random access point (RAP) pictures having discarded leading pictures. In some examples, when a bitstream includes a subsequent RAP picture that follows an initial RAP picture, a decoder may be configured to shift a coded picture buffer (CPB) removal time for access units that follow the subsequent RAP picture when leading pictures, such as random access skipped leading (RASL) pictures, for the subsequent RAP picture are not present.

In one example of the disclosure, a method of processing video data includes receiving in a video bitstream an access unit having a first random access point (RAP) picture, receiving in the video bitstream, after the access unit in the bitstream, a subsequent access unit having a second RAP picture, and in the case that one or more random access skipped leading (RASL) pictures for the subsequent access unit are not present in the received bitstream, shifting a picture buffer removal time earlier based on a picture buffer removal delay offset.

In another example of the disclosure, a method of processing video data includes receiving an access unit after an earlier initialization of a hypothetical reference decoder (HRD), the access unit having a random access point (RAP) picture, wherein associated access units containing random access skipped leading (RASL) pictures are not received, and re-initializing a picture buffer removal time and a picture buffer removal delay offset in response to receiving the access unit and not receiving the associated access units containing RASL pictures.

In another example, the disclosure describes a device for processing video data including a processor configured to receive in a video bitstream an access unit having a RAP picture, receive in the video bitstream, after the access unit in the bitstream, a subsequent access unit having a second RAP picture, and in the case that one or more random access skipped leading (RASL) pictures for the subsequent access unit are not present in the received bitstream, shift a picture buffer removal time earlier based on a picture buffer removal delay offset.

In another example, the disclosure describes a device for processing video data including a processor configured to receive an access unit after an earlier initialization of a hypothetical reference decoder (HRD), the access unit having a RAP picture, wherein associated access units containing RASL pictures are not received, and re-initializing the HRD, including re-initializing a picture buffer removal time and a picture buffer removal delay offset in response to receiving the access unit and not receiving the associated access units containing RASL pictures.

In another example, the disclosure describes a device for processing video data including means for receiving in a video bitstream an access unit having a RAP picture, means for receiving in the video bitstream, after the access unit in the bitstream, a subsequent access unit having a second RAP picture, and means for shifting a picture buffer removal time earlier based on a picture buffer removal delay offset in the case that one or more random access skipped leading (RASL) pictures for the subsequent access unit are not present in the received bitstream.

In another example, the disclosure describes a device for processing video data including means for receiving an access unit after an earlier initialization of the hypothetical reference decoder (HRD), the access unit having a RAP picture, wherein associated access units containing RASL pictures are not received, and means for re-initializing the HRD, including re-initializing a picture buffer removal time and a picture buffer removal delay offset in response to receiving the access unit and not receiving the associated access units containing RASL pictures.

In another example, the disclosure describes a computer-readable storage medium. The computer-readable storage medium having stored thereon instructions that upon execution cause one or more processors to receive in a video bitstream an access unit having a RAP picture, receive in the video bitstream, after the access unit in the bitstream, a subsequent access unit having a second RAP picture, and in the case that one or more random access skipped leading (RASL) pictures for the subsequent access unit are not present in the received bitstream, shift a picture buffer removal time earlier based on a picture buffer removal delay offset.

In another example, the disclosure describes a computer-readable storage medium. The computer-readable storage medium having stored thereon instructions that upon execution cause one or more processors to receive an access unit after an earlier initialization of the hypothetical reference decoder (HRD), the access unit having a random access point (RAP) picture, wherein associated access units containing random access skipped leading (RASL) pictures are not received, and re-initialize the HRD, including re-initializing a picture buffer removal time and a picture buffer removal delay offset in response to receiving the access unit and not receiving the associated access units containing RASL pictures.

In another example, the disclosure describes a method of processing video data including signaling a CPB removal delay offset for each CRA or BLA access unit, shifting the CPB removal time of each of the access units following the CRA or BLA access unit in decoding order earlier by the CPB removal delay offset for each CRA or BLA access unit for which the associated RASL pictures are not present, regardless of whether the HRD initializes at the CRA or BLA access unit.

In some examples, the disclosure describes various methods. A wide variety of processors, processing units, and apparatuses may be configured to implement the example methods. The disclosure also describes computer-readable storage media that may be configured to perform the functions of any one or more of the example methods.

The details of one or more examples are set forth in the accompanying drawings and the description below. Other features, objects, and advantages will be apparent from the description and drawings, and from the claims.

DETAILED DESCRIPTION

Figure 1:
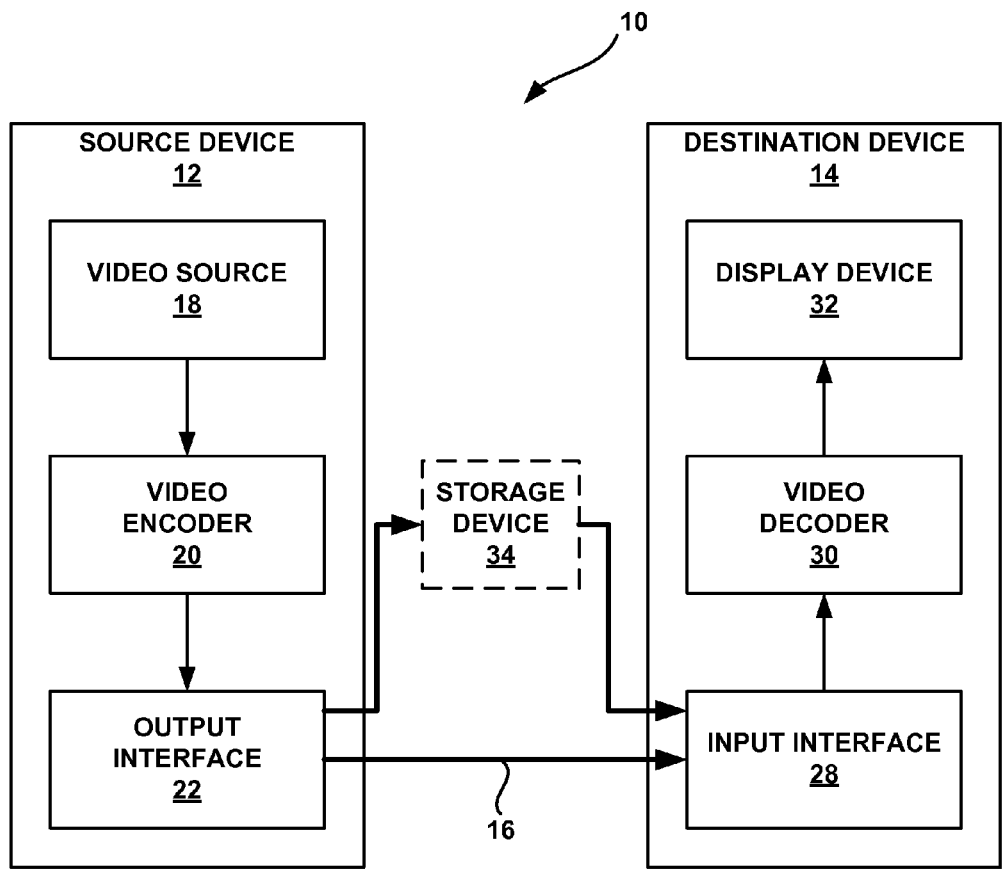
FIG. 1 is a block diagram illustrating an example video encoding and decoding system that may utilize the techniques described in this disclosure.

This disclosure describes various techniques for controlling buffering operations in a video decoder for random access point (RAP) pictures having discarded leading pictures. The techniques may support improved hypothetical reference decoder (HRD) operations, which can be applied across intermediate access units (AUs) containing clean random access (CRA) or broken link access (BLA) pictures, for which associated random access skipped leading (RASL) access units are discarded. A CRA picture contains only I slices, and may be the first picture in the bitstream in decoding order, or may appear later in the bitstream. A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream. A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set. RASL pictures are leading pictures of an associated BLA or CRA picture. All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated RAP picture.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, there is a new video coding standard, namely High-Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A Working Draft (WD) of HEVC, Bross, et al., "High Efficiency Video Coding (HEVC) text specification draft 9," and referred to as HEVC WD9 hereinafter, is available from http://phenix.int-evry.fr/jct/doc_end_user/documents/11_Shanghai/wg11/JCTVC-K1003-v13.zip, as of Jan. 7, 2013.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which is downloadable from:
http://phenix.int-evry.fr/jct/doc_end_user/documents/12_Geneva/wg11/JCTVC-L1003-v34.zip.

Another draft of the HEVC standard, referred to herein as "WD10 revisions," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which as of Jun. 7, 2013, is available from:
http://phenix.int-evry.fr/jct/doc_end_user/documents/13_Incheon/wg11/JCTVC-M0432-v3.zip HEVC standardization efforts are based on a model of a video coding device referred to as the HEVC Test Model (HM). The HM presumes improvements in the capabilities of current video coding devices with respect to video coding devices available during the development of other previous video coding standards, e.g., ITU-T H.264/AVC. For example, whereas H.264 provides nine intra-prediction encoding modes, HEVC provides as many as thirty-five intra-prediction encoding modes. The entire contents of HEVC WD9 and HEVC WD10 are incorporated herein by reference.

Video coding standards typically include a specification of a video buffering model. In AVC and HEVC, the buffering model is referred to as the hypothetical reference decoder (HRD), which includes a buffering model of both the coded picture buffer (CPB) and the decoded picture buffer (DPB). The CPB and DPB behaviors are mathematically specified. The HRD directly imposes constraints on different timing, buffer sizes and bit rates, and indirectly imposes constraints on bitstream characteristics and statistics. A complete set of HRD parameters include five basic parameters: initial CPB removal delay, CPB size, bit rate, initial DPB output delay, and DPB size.

In AVC and HEVC, bitstream conformance and decoder conformance are specified as parts of the HRD specification. Although the HRD is referred to as a decoder, the HRD specification is typically needed at the encoder side to guarantee bitstream conformance. Two types of bitstream or HRD conformance, namely Type I and Type II, are specified. In addition, two types of decoder conformance (output timing decoder conformance and output order decoder conformance) are specified.

The HRD is typically initialized at a random access point (RAP) picture. In both HEVC and AVC, once the HRD is initialized, it continues to operate until the end of a bitstream without re-initialization.

In HEVC WD9, if the HRD initializes at a CRA or BLA access unit (this initial access unit is referred to as access unit 0, either the default or the alternative initial CPB removal delay and delay offset associated with the initial access unit 0 are chosen to be used in the HRD operations, depending on whether the RASL access units associated with access unit 0 are present. If the RASL access units associated with access unit 0 are not present, the alternative initial CPB removal delay and delay offset are chosen, e.g., by a video decoder; otherwise (i.e., the RASL access units associated with access unit 0 are present), the default initial CPB removal delay and delay offset are chosen e.g., by a video decoder. The chosen set of initial CPB removal delay and delay offset is then used e.g., by a video decoder until the end of the bitstream.

In U.S. Patent Publication 2013/0107953, publication date May 2, 2013, filed Oct. 30, 2012, the entire content of which is incorporated herein by reference, the following method is described. A CPB removal delay offset may be signalled for each CRA access unit. If the HRD initializes at such a CRA access unit (also referred to as access unit 0), and the associated RASL pictures are not present, the CPB removal time of each of the access units following the CRA access unit in decoding order is shifted earlier by the CPB removal delay offset.

HRD techniques as described in HEVC WD9 exhibit the following problems. First, assume that the chosen set of initial CPB removal delay and delay offset applies to the case wherein all the CRA or BLA access units, if present, following access unit 0 in decoding order in the bitstream, have their associated RASL access units present. The current techniques of HEVC WD9 would only work correctly if there is no CRA or BLA access unit that follows access unit 0 in decoding order in the bitstream, and for which the associated RASL access units are not present. However, if there is such a CRA or BLA access unit present in the bitstream, the CPB may overflow after the first such CRA or BLA access unit, and consequently unexpected decoding results may occur.

Similarly, assume that the chosen set of initial CPB removal delay and delay offset applies to the case wherein all the CRA or BLA access units, if present, following access unit 0 in decoding order in the bitstream, do not have their associated RASL access units present. The current techniques of HEVC WD9 would only work correctly if there is no CRA or BLA access unit that follows access unit 0 in decoding order in the bitstream, and the associated RASL access units for access unit 0 are present, and would not work correctly if there is such a CRA or BLA access unit present in the bitstream. Under the techniques proposed for HEVC WD9, this applies to any CRA or BLA access unit when the chosen set of initial CPB removal delay and delay offset applies to the case wherein all the CRA or BLA access units, if present, following access unit 0 in decoding order in the bitstream, do not have their associated RASL access units present Other assumptions on a chosen set of initial CPB removal delay and delay offset may also result in incorrect decoding. For example, a situation where some CRA or BLA access units following access unit 0 have their associated RASL access units present, and other CRA or BLA access units following access unit 0 do not have their associated RASL access units present, may also not decode correctly either, as long as the assumption on the presences and absences of the associated RASL access units for the following CRA or BLA access units does not hold.

In some cases, the CPB removal delay offset can only compensate the CPB removal times for access units following access unit 0 due to the discarding of the RASL access units associated with access unit 0. If there is one or more than one CRA or BLA access units that follow access unit 0 in decoding order present in the bitstream and for which the associated RASL access units have been discarded, the CPB may overflow after the first such CRA or BLA access unit, and consequently unexpected decoding result may occur.

Another problem associated with the method in HEVC WD9 is as follows. Currently, when access unit (AU) 0 is a CRA or BLA AU, if the associated RASL AUs are present, the default initial CPB removal delay and delay offset are used; otherwise the alternative initial CPB removal delay and delay offset are used. However, the change of the initial CPB removal delay and delay offset does not change the time duration between the (nominal) decoding times of AU0 and the first non-RASL AU following AU0 in decoding order. For example, assume that there were 10 RASL pictures immediately following AU0 in decoding order and immediately followed by trailing pictures in the original bitstream. In this situation, the CPB removal time is equal to the nominal CPB removal time for each AU, and the time duration between the decoding times of any two consecutive AUs is one clock tick when the original bitstream is decoded. According to HEVC WD9, the time duration between the decoding times of AU0 and the first trailing picture would be the same (11 clock ticks) regardless of whether the RASL pictures are discarded. Thus, decoding is continuous for the original bitstream, but not when the RASL pictures are discarded.

In view of these problems, this disclosure provides various methods and techniques for improving video buffering (e.g., improving the HRD of HEVC WD9). Various examples will be described with reference to HEVC WD9. Any HRD techniques not specifically mentioned may be assumed to be the same as currently specified in HEVC WD9 or other HEVC specifications.

In one example of the disclosure, a CPB removal delay offset is signaled by a video encoder for each CRA or BLA access unit. For each CRA or BLA access unit for which the associated RASL pictures are not present, regardless of whether the HRD (e.g., the video decoder) initializes at the CRA or BLA access unit, video decoder shifts the CPB removal time of each of the access units following the CRA or BLA access unit in decoding order earlier by the CPB removal delay offset. In one example, the offset may be a cumulative offset. Such an offset may be applied to shift the CPB removal time of each of the access units following the CRA or BLA access unit in decoding order earlier by the cumulative amount. Additionally, when the offset due to each "missing RASL picture" is identical, the offset may be an offset per picture. In such an example, the offset may be multiplied by the number of missing pictures. The selection between the alternative and default initial CPB removal delay and delay offset for access unit 0 may be performed in the same way as in HEVC WD9. In another example, the default initial CPB removal delay and delay offset for access unit 0 are always chosen (i.e., always used by video decoder), and consequently, the alternative initial CPB removal delay and delay offset are not signaled by the encoder for CRA or BLA access units unless sub-picture level CPB parameters are present and then the alternative initial CPB removal delay and delay offset are for the purpose of sub-picture level HRD operations.

In an example method of processing video data, a decoder may receive a first access unit having a random access point (RAP) picture in a video bitstream. The decoder may also receive one or more subsequent access units having a RAP picture after the access unit having the RAP picture. For example, the decoder may receive one or more CRA or BLA pictures. In the case that one or more RASL pictures for a subsequent access unit of the one or more subsequent access units are not present in the received bitstream, the decoder may shift a picture buffer removal time for a coded picture buffer (CPB) earlier based on a picture buffer removal delay offset.

In another example method of processing video data, a decoder may receive an access unit having a RAP picture, wherein associated access units containing RASL pictures are not received. The decoder may initialize a picture buffer removal time and a picture buffer removal delay offset in response to receiving the access unit and not receiving the associated access units containing RASL pictures.

In another example of the disclosure, the HRD specifies that a video decoder initializes or re-initializes at each CRA or BLA access unit for which the associated RASL access units are not present. In the examples above related to shifting a picture buffer removal time earlier based on a picture buffer removal delay offset such an initialization or re-initialization may not be necessary.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface 28. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

In AVC and HEVC, bitstream conformance and decoder conformance are specified as parts of the HRD specification. HRD is typically needed at the video encoder 20 side to guarantee bitstream conformance, while typically not needed at the decoder side. Two type of bitstream or HRD conformance, namely Type I and Type II, are specified. In addition, two types of decoder conformance, output timing decoder conformance and output order decoder conformance are specified.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As discussed above, the JCT-VC has developed the HEVC standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, includes a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU generally corresponds to a size of the coding node and must typically be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT).

The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally includes a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data to which the transforms specified by TUs of the CU are applied. The residual data may correspond to pixel differences between pixels of the unencoded picture and prediction values corresponding to the CUs. Video encoder 20 may form the residual data for the CU, and then transform the residual data to produce transform coefficients.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In some examples, destination device 14 may implement a method of processing video data. For example, video decoder 30 may receive an access unit having a RAP picture. The video decoder may also receive one or more subsequent access units after the access unit having the RAP picture. In the case that a subsequent access unit of the one or more subsequent access units does not have associated RASL pictures, video decoder 30 shifts a picture buffer removal time earlier based on a picture buffer removal delay offset. For example, a buffering period SEI message may include a CPB delay offset value, e.g., cpb_delay_offset[i] that specifies, for the i-th CPB, an offset to be used. The offset may be used, for example, in derivation of the nominal CPB removal times of access units following, in decoding order, the CRA or BLA access unit associated with the buffering period SEI message when the RASL access units associated with the CRA or BLA access unit are not present. The syntax element may have a length in bits given by au_cpb_removal_delay_length_minus1+1 and may be, for example, in units of a 90 kHz clock.

In other examples, destination device 14 may implement another method of processing video data. For example, video decoder 30 may receive an access unit having a RAP picture, wherein associated access units containing random access skipped leading (RASL) pictures are not received. Video decoder 30 may initialize a picture buffer removal time and a picture buffer removal delay offset in response to receiving the access unit and not receiving the associated access units containing RASL pictures.

In another example, video decoder 30 may receive an access unit having a RAP picture, wherein associated access units containing RASL pictures are not received. Video decoder 30 may also initialize a picture buffer removal time and a picture buffer removal delay offset in response to receiving the access unit and not receiving the associated access units containing RASL pictures.

Figure 2:
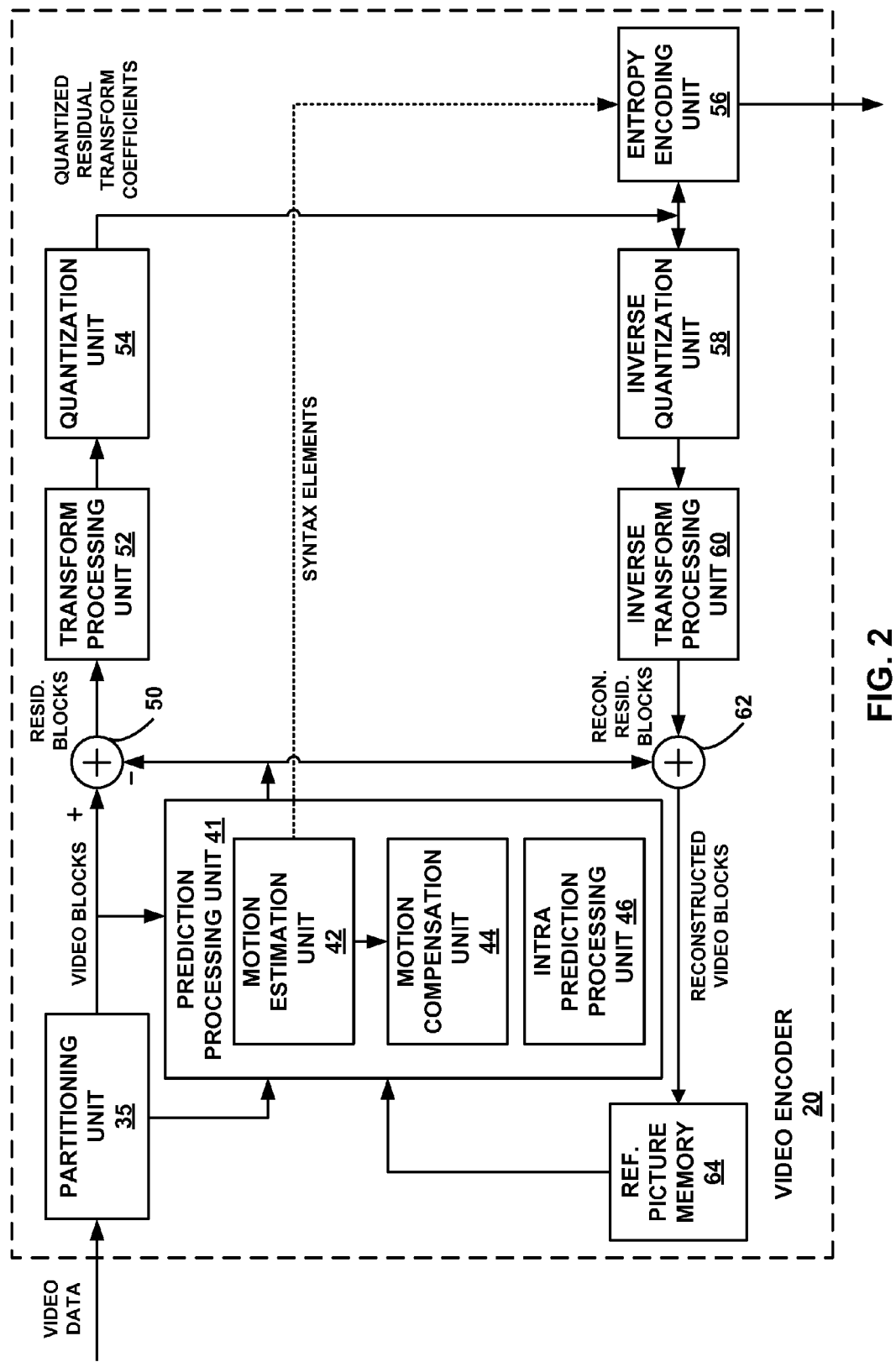
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64 (sometimes called a decoded picture buffer (DPB)). The reference block may be used by motion estimation unit 42 and motion compensation unit 44 as a reference block to inter-predict a block in a subsequent video frame or picture.

As discussed above, in AVC and HEVC, bitstream conformance and decoder conformance are specified as parts of the HRD specification. Though the HRD is referred to as some kind of decoder, the HRD is typically needed at video encoder 20 to guarantee bitstream conformance, while typically not needed at the decoder side. Two types of bitstream or HRD conformance, namely Type I and Type II, are specified. In addition, two types of decoder conformance, output timing decoder conformance and output order decoder conformance are specified.

The HRD is typically initialized at a random access point (RAP) picture. In both HEVC and AVC, once the HRD is initialized, it continues to operate until the end of a bitstream without re-initialization.

In HEVC WD9, if the HRD initializes at a CRA or BLA access unit this access unit is referred to as access unit 0. In some examples, video encoder 20 may transmitted or store both the default and the alternative initial CPB removal delay and delay offset associated with access unit 0 to be used in the HRD operations. The video encoder 20 may then signal the default and the alternative initial CPB removal delay and delay offset associated with access unit 0. If the RASL access units associated with access unit 0 are not present, the alternative initial CPB removal delay and delay offset are chosen, otherwise (the RASL access units associated with access unit 0 are present), the default initial CPB removal delay and delay offset are chosen. The chosen set of initial CPB removal delay and delay offset may then be signaled in the bitstream. The chosen set of initial CPB removal delay and delay offset may also then be used until the end of the bitstream. This information may be signaled, e.g., from video encoder 20, using a buffering period SEI message that includes a CPB delay offset value, e.g., cpb_delay_offset[i] that specifies, for the i-th CPB, an offset to be used.

In an example, video encoder 20 may signal a CPB removal delay offset for each CRA or BLA access unit. For each CRA or BLA access unit for which the associated RASL pictures are not present, regardless of whether the HRD initializes at the CRA or BLA access unit, the CPB removal time of each of the access units following the CRA or BLA access unit in decoding order is shifted, e.g., at video decoder 30, earlier by the CPB removal delay offset. The selection between the alternative and default initial CPB removal delay and delay offset for access unit 0 is performed in the same way as in HEVC WD9. Alternatively, the default initial CPB removal delay and delay offset for access unit 0 are always chosen and consequently the alternative initial CPB removal delay and delay offset might not be signaled for CRA or BLA access units unless sub-picture level CPB parameters are present and then the alternative initial CPB removal delay and delay offset are used, e.g., by video decoder 30, for the purpose of sub-picture level HRD operations.

In some examples, video encoder 20 may encode a buffering period supplemental enhancement information (SEI) message, e.g., with syntax and semantics as described in subclause C.2.3 of HEVC WD9 (timing of decoding unit removal and decoding of decoding unit). Video encoder 20 may implement the changes described herein in conjunction with, for example, HEVC WD9. Other parts not mentioned may be the same as in HEVC WD9, or other HEVC standards, such as subsequent HEVC standards.

Figure 3:
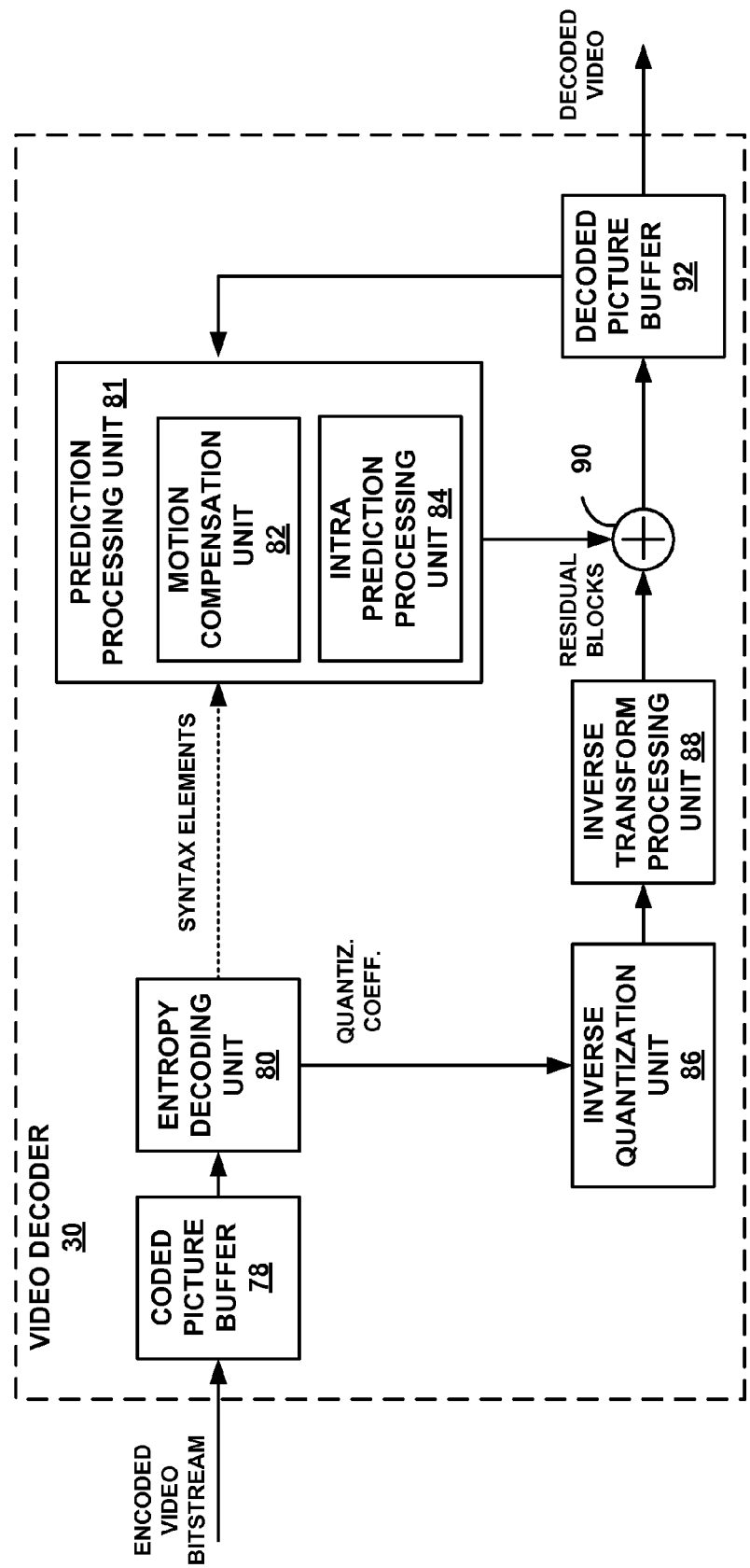
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes coded picture buffer (CPB) 78, entropy decoding unit 80, prediction processing unit 81, inverse quantization unit 86, inverse transformation processing unit 88, summer 90, and decoded picture buffer (DPB) 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

CPB 78 stores coded pictures from the encoded picture bitstream. In one example, CPB 78 is a first-in first-out buffer containing access units (AU) in decoding order. An AU is set of network abstraction layer (NAL) units that are associated with each other according to a specified classification rule, are consecutive in decoding order, and contain exactly one coded picture. Decoding order is the order in which pictures are decoded, and may differ from the order in which pictures are displayed (i.e., the display order). The operation of the CPB may be specified by a hypothetical reference decoder (HRD) in HEVC WD9.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in DPB 92, which stores reference pictures used for subsequent motion compensation. DPB 92 also stores decoded video for later presentation on a display device, such as display device 32 of FIG. 1. Like CPB 78, in one example, the operation of DPB 92 may be specified by the HRD in HEVC WD9. CPB 78 and DPB 92 may comprise memory units modules, or may comprise the same memory partitioned into different regions to define CPB 78 and DPB 92.

The next section of the disclosure will discuss HEVC features of random access, bitstream switching, and random access point (RAP) pictures.

Random access refers to a decoding of a video bitstream starting from a coded picture that is not the first coded picture in the bitstream. Random access to a bitstream is needed in many video applications, such as broadcasting and streaming, e.g., for users to tune-in to a program anytime, to switch between different channels, to jump to specific parts of the video, or to switching to a different bitstream for stream adaptation (e.g., adaptation of the bit rate, frame rate, spatial resolution, and so on). Random access is enabled by inserting random access pictures or random access points (RAPs), many times in regular intervals, into the video bitstream.

Bitstream splicing refers to the concatenation of two or more bitstreams or parts thereof. For example, a first bitstream may be appended with a second bitstream, possibly with some modifications to either one or both of the bitstreams to generate a spliced bitstream. The first coded picture in the second bitstream is also referred to as the splicing point. Therefore, pictures after the splicing point in the spliced bitstream were originated from the second bitstream while pictures preceding the splicing point in the spliced bitstream were originated from the first bitstream.

Splicing of bitstreams is performed by bitstream splicers. Bitstream splicers are often lightweight (i.e., less complex or less capable in terms of processing) and much less intelligent than video encoders 20. For example, they may not be equipped with entropy decoding and encoding capabilities.

Bitstream switching may be used in adaptive streaming environments. A bitstream switching operation at certain pictures in the switched-to bitstream is effectively a bitstream splicing operation wherein the splicing point is the bitstream switching point, i.e., the first picture in the switched-to bitstream.

The following section will discuss RAP pictures. One example of a RAP picture is an Instantaneous decoding refresh (IDR) picture. An IDR picture, as specified in AVC or HEVC, can be used for random access. However, since pictures following an IDR picture in decoding order cannot use pictures decoded prior to the IDR picture as references (e.g., for inter-prediction), bitstreams relying on IDR pictures for random access can have significantly lower coding efficiency.

To improve coding efficiency, the concept of clean random access (CRA) pictures was introduced in HEVC to allow pictures that follow a CRA picture in decoding order, but precede it in output order, to use pictures decoded before the CRA picture as a reference. Pictures that follow a CRA picture in decoding order, but precede the CRA picture in output order, are referred to as leading pictures associated with the CRA picture (or leading pictures of the CRA picture). The leading pictures of a CRA picture are correctly decodable if the decoding starts from an IDR or CRA picture before the current CRA picture. However, the leading pictures of a CRA picture may be non-decodable when random access from the CRA picture occurs; hence the leading pictures are typically discarded during random access decoding. To prevent error propagation from reference pictures that may not be available depending on where the decoding starts, one proposal for HEVC specifies that all pictures that follow a CRA picture both in decoding order and output order shall not use any picture that precedes the CRA picture either in decoding order or output order (which includes the leading pictures) as a reference.

The concept of a broken link access (BLA) picture was further introduced in HEVC after the introduction of CRA pictures, and is based on the concept of CRA pictures. A BLA picture typically originates from bitstream splicing at the position of a CRA picture, and in the spliced bitstream, the splicing point CRA picture is changed to a BLA picture.

IDR pictures, CRA pictures and BLA pictures are collectively referred to as random access point (RAP) pictures. One significant difference between BLA pictures and CRA pictures is as follows. For a CRA picture, the associated leading pictures are correctly decodable if the decoding starts from a RAP picture before the CRA picture in decoding order, and may be non-correctly-decodable when random access from the CRA picture occurs (i.e., when the decoding starts from the CRA picture, or in other words, when the CRA picture is the first picture in the bitstream). For a BLA picture, the associated leading pictures may be non-decodable in all cases, even when the decoding starts from a RAP picture before the BLA picture in decoding order.

For a particular CRA or BLA picture, some of the associated leading pictures are correctly decodable even when the CRA or BLA picture is the first picture in the bitstream. These leading pictures are referred to as decodable leading pictures (DLPs) or random access decodable leading (RADL) pictures. Other leading pictures are referred to as non-decodable leading pictures (NLPs), tagged for discard (TFD) pictures or random access skipped leading (RASL) pictures.

HEVC WD9 specifies the concepts of a bitstream as a sequence of bits that forms the representation of coded pictures and associated data forming one or more coded video sequences. Bitstream is a collective term used to refer either to a NAL unit stream or a byte stream. HEVC WD9 specifies the concepts of an elementary stream (ES) as a sequence of one or more bitstreams.

An elementary stream that consists of two or more bitstreams would typically have been formed by splicing together two or more bitstreams (or parts thereof). If an elementary stream contains multiple bitstreams, except for the last bitstream, at the end of each of the other bitstreams there typically is an end of bitstream (EOS) NAL unit.

Video coding standards typically include a specification of a video buffering model. In AVC and HEVC, the buffering model is referred to as the hypothetical reference decoder (HRD), which includes a buffering model of both the coded picture buffer (CPB) and the decoded picture buffer (DPB). The CPB and DPB behaviors are mathematically specified. The HRD directly imposes constraints on different timing, buffer sizes and bit rates, and indirectly imposes constraints on bitstream characteristics and statistics. A complete set of HRD parameters include five basic parameters: initial CPB removal delay, CPB size, bit rate, initial DPB output delay, and DPB size.

In AVC and HEVC, bitstream conformance and decoder conformance are specified as parts of the HRD specification. Though it is referred to as a decoder, the HRD specification is typically needed at the encoder side to guarantee bitstream conformance. Two types of bitstream or HRD conformance, namely Type I and Type II, are specified. In addition, two types of decoder conformance (output timing decoder conformance and output order decoder conformance) are specified.

The HRD is typically initialized at a random access point picture. In both HEVC and AVC, once the HRD is initialized, it continues to operate until the end of a bitstream without re-initialization.

In HEVC WD9, if the HRD initializes at a CRA or BLA access unit (this access unit is referred to as access unit 0), either the default or the alternative initial CPB removal delay and delay offset associated with access unit 0 are chosen to be used in the HRD operations, depending on whether the RASL access units associated with access unit 0 are present. If the RASL access units associated with access unit 0 are not present, the alternative initial CPB removal delay and delay offset are chosen; otherwise (i.e., the RASL access units associated with access unit 0 are present), the default initial CPB removal delay and delay offset are chosen. The chosen set of initial CPB removal delay and delay offset is then used by the video decoder 30 until the end of the bitstream.

In U.S. patent application Ser. No. 13/664,279, filed Oct. 30, 2012, the entire content of which is incorporated herein by reference, the following method is described. A CPB removal delay offset may be signalled for each CRA access unit. If the HRD initializes at such a CRA access unit (also referred to as access unit 0), and the associated RASL pictures are not present, the CPB removal time of each of the access units following the CRA access unit in decoding order is shifted earlier by the CPB removal delay offset.

HRD techniques in HEVC WD9 exhibit the following problems. First, assume that the chosen set of initial CPB removal delay and delay offset applies to the case wherein all the CRA or BLA access units, if present, following access unit 0 in decoding order in the bitstream, have their associated RASL access units present. The current techniques of HEVC WD9 would only work correctly if there is no CRA or BLA access unit that follows access unit 0 in decoding order in the bitstream, and for which the associated RASL access units are not present. However, if there is such a CRA or BLA access unit present in the bitstream, the CPB may overflow after the first such CRA or BLA access unit, and consequently unexpected decoding results may occur.

Similarly, assume that the chosen set of initial CPB removal delay and delay offset applies to the case wherein all the CRA or BLA access units, if present, following access unit 0 in decoding order in the bitstream, do not have their associated RASL access units present. The current techniques of HEVC WD9 would only work correctly if there is no CRA or BLA access unit that follows access unit 0 in decoding order in the bitstream, and for which the associated RASL access units are present, and would not work correctly if there is such a CRA or BLA access unit present in the bitstream.

Other assumptions on a chosen set of initial CPB removal delay and delay offset may also result in incorrect decoding. For example, a situation where some CRA or BLA access units following access unit 0 have their associated RASL access units present, and other CRA or BLA access units following access unit 0 do not have their associated RASL access units present, may also not decode correctly either, as long as the assumption on the presences and absences of the associated RASL access units for the following CRA or BLA access units does not hold.

The CPB removal delay offset can only compensate the CPB removal times for access units following access unit 0 due to the discarding of the RASL access units associated with access unit 0. If there is one or more than one CRA or BLA access units that follow access unit 0 in decoding order present in the bitstream and for which the associated RASL access units have been discarded, the CPB may overflow after the first such CRA or BLA access unit, and consequently unexpected decoding result may occur.

Another problem associated with the method in HEVC WD9 is as follows. Currently, when access unit (AU) 0 is a CRA or BLA AU, if the associated RASL AUs are present, the default initial CPB removal delay and delay offset are used; otherwise the alternative initial CPB removal delay and delay offset are used. However, the change of the initial CPB removal delay and delay offset does not change the time duration between the (nominal) decoding times of AU0 and the first non-RASL AU following AU0 in decoding order. For example, assume that there were 10 RASL pictures immediately following AU0 in decoding order and immediately followed by trailing pictures in the original bitstream. In this situation, the CPB removal time is equal to the nominal CPB removal time for each AU, and the time duration between the decoding times of any two consecutive AUs is one clock tick when the original bitstream is decoded. According to HEVC WD9, the time duration between the decoding times of AU0 and the first trailing picture would be the same (11 clock ticks) regardless of whether the RASL pictures are discarded. Thus, decoding is continuous for the original bitstream, but not when the RASL pictures are discarded.

In view of these problems, this disclosure provides the following methods and techniques for improving video buffering (e.g., improving the HRD of HEVC WD9. The following examples will be described with reference to HEVC WD9. Any HRD techniques not specifically mentioned may be the same as currently specified in HEVC WD9, or other HEVC standards, such as subsequent HEVC standards.

In a first example of the disclosure, a CPB removal delay offset is signaled by video encoder 20 for each CRA or BLA access unit. For each CRA or BLA access unit for which the associated RASL pictures are not present, regardless of whether the HRD (e.g., video decoder 30) initializes at the CRA or BLA access unit, video decoder 30 shifts the CPB removal time of each of the access units following the CRA or BLA access unit in decoding order earlier by the CPB removal delay offset. As described above, a buffering period SEI message may include a CPB delay offset value, e.g., cpb_delay_offset[i] that specifies, for the i-th CPB, an offset to be used. The offset may be used, for example, in derivation of the nominal CPB removal times of access units following, in decoding order, the CRA or BLA access unit associated with the buffering period SEI message when the RASL access units associated with the CRA or BLA access unit are not present. The syntax element may have a length in bits given by au_cpb_removal_delay_length_minus1+1 and may be, for example, in units of a 90 kHz clock.

The selection between the alternative and default initial CPB removal delay and delay offset for access unit 0 may be performed in the same way as in, for example, HEVC WD9. In another example, the default initial CPB removal delay and delay offset for access unit 0 are always chosen (e.g., chosen at the video encoder 20 for use by video decoder 30). Consequently, video encoder 20 does not signal the alternative initial CPB removal delay and delay offset for CRA or BLA access units unless sub-picture level CPB parameters are present and then the alternative initial CPB removal delay and delay offset are for the purpose of sub-picture level HRD operations. The alternative initial CPB removal delay and delay offset may be signalled using a buffering period SEI message having the syntax described herein.

In a second example of the disclosure, the HRD specifies that a video decoder (e.g., video decoder 30) initializes or re-initializes at each CRA or BLA access unit for which the associated RASL access units are not present, e.g., as identified by either of the following conditions being true:

a. nal_unit_type is equal to CRA_NUT or BLA_W_LP, and UseAltCpbParamsFlag is equal to 1;
   b. nal_unit_type is equal to BLA_W_DLP or BLA_N_LP.

The syntax element nal_unit_type specifies the type of a raw byte sequence payload (RBSP) data structure contained in the network abstract layer (NAL) unit. CRA_NUT is a NAL type for a coded slice segment of a CRA picture. BLA_W_LP is a NAL type for a coded slice segment of a BLA picture. A BLA picture having nal_unit_type equal to BLA_W_LP may have associated RASL or RADL pictures present in the bitstream. A BLA picture having nal_unit_type equal to BLA_W_DLP does not have associated RASL pictures present in the bitstream, but may have associated RADL pictures in the bitstream. Accordingly, when a BLA picture has a nal_unit_type equal to BLA_W_LP (which again may have associated RASL or RADL pictures present in the bitstream) video decoder 30 may initializes or re-initializes at each CRA or BLA access unit. A BLA picture having nal_unit_type equal to BLA_N_LP does not have associated leading pictures present in the bitstream. Accordingly, when a BLA picture has a nal_unit_type equal to BLA_N_LP video decoder 30 does not generally initializes or re-initializes at each CRA or BLA access unit. UseAltCpbParamsFlag indicates whether or not alternative CPB parameters are used. If alternative CPB parameters are used video decoder 30 may use an offset specified by a CPB delay offset value, e.g., cpb_delay_offset [i] that specifies, for the i-th CPB, the offset to be used.

In a third example of the disclosure, each CRA or BLA access unit for which the associated RASL access units are not present, e.g., as identified by either of the following conditions being true, is considered, e.g., by video decoder 30, as the first access unit in a bitstream (i.e., such an access unit starts a new bitstream), and thus it is not required that an end of bitstream NAL unit be present at the end of each bitstream that is not the last bitstream in an elementary stream:
  a. nal_unit_type is equal to CRA_NUT or BLA_W_LP, and UseAltCpbParamsFlag is equal to 1;
  b. nal_unit_type is equal to BLA_W_DLP or BLA_N_LP.

Consequently, in implementing the HRD model, video decoder 30 initializes or re-initializes the HRD at the access unit in accordance with the HEVC standard, for example. In this third example, as discussed above, each CRA or BLA access unit for which the associated RASL access units are not present is considered as the first access unit in a bitstream.

In a fourth example of the disclosure, for each CRA or BLA access unit for which the associated RASL access units are not present, e.g., as identified by either of the following conditions being true, it is required that there is an end of bitstream NAL unit immediately preceding, in decoding order, the first NAL unit in the access unit:
  a. nal_unit_type is equal to CRA_NUT or BLA_W_LP, and UseAltCpbParamsFlag is equal to 1;
  b. nal_unit_type is equal to BLA_W_DLP or BLA_N_LP.

Consequently, in implementing the HRD model, video decoder 30 may initialize or re-initializes the HRD at the access unit in accordance with the HEVC standard, for example.

Common to the second, third, and fourth examples above, when the video decoder 30 initializes or re-initializes at a CRA or BLA access unit, in some examples, both the default and the alternative initial CPB removal delay and delay offset associated with the access unit may be transmitted or stored by video decoder 30 to be used in the HRD operations, depending on whether the RASL access units associated with the access unit are present. If the RASL access units associated with the access unit are not present (e.g. when either of the above two conditions a or b is true), the alternative initial CPB removal delay and delay offset are chosen; otherwise (the RASL access units associated with the access unit are present), the default initial CPB removal delay and delay offset are chosen. The chosen set of initial CPB removal delay and delay offset is then used by video decoder 30 until the HRD is re-initialized or the end of the bitstream. In one example, when such a CRA or BLA access unit is not the first access unit in the bitstream (i.e. not access unit 0), only the CPB is re-initialized, the DPB is not re-initialized. In another example, when such a CRA or BLA access unit is not the first access unit in the bitstream (i.e. not access unit 0), neither the CPB nor the DPB is re-initialized, but rather, a choice is made between the alternative or default initial CPB removal delay and delay offset similarly to the description above. For example, video decoder 30 may select between the alternative or default initial CPB removal delay and delay offset and then the selected alternative may be used by, e.g., video decoder 30 until the HRD is re-initialized or the end of the bitstream.

A discussion of the first example technique is provided below. Any references to clauses and subclauses below refer to HEVC WD9. Unless specifically stated, the operation and meaning of all syntax elements is defined in HEVC WD9, and may generally be applied to subsequent HEVC extensions.

In accordance with the systems and methods described herein, the buffering period SEI message syntax and semantics in subclause C.2.3 of HEVC WD9 (timing of decoding unit removal and decoding of decoding unit) in, e.g., HEVC WD9, may be changed as follows. Video decoder 30 may, for example, implement decoding using some or all aspects of the buffering period SEI message syntax and semantics of subclause C.2.3 of HEVC WD9. The updated syntax elements are bolded. Other parts not mentioned may be the same as in HEVC WD9 or subsequent HEVC standards.

TABLE 1

Buffering period SEI message syntax

| buffering_period( payloadSize ) { | Descriptor |
|---|---|
|   bp_seq_parameter_set_id | ue(v) |
|   if( !sub_pic_cpb_params_present_flag ) | |
|     rap_cpb_params_present_flag | u(1) |
|   if( NalHrdBpPresentFlag ) { | |
|     for( i = 0; i <= CpbCnt; i++ ) { | |
|       initial_cpb_removal_delay[ i ] | u(v) |
|       initial_cpb_removal_offset[ i ] | u(v) |
|       if( sub_pic_cpb_params_present_flag || rap_cpb_params_present_flag ) { | |
|         initial_alt_cpb_removal_delay[ i ] | u(v) |
|         initial_alt_cpb_removal_offset[ i ] | u(v) |
|       } | |
|       if( rap_cpb_params_present_flag ) | |
|         cpb_delay_offset[ i ] | u(v) |
|     } | |
|   } | |
|   if( VclHrdBpPresentFlag ) { | |
|     for( i = 0; i <= CpbCnt; i++ ) { | |
|       initial_cpb_removal_delay[ i ] | u(v) |
|       initial_cpb_removal_offset[ i ] | u(v) |
|       if( sub_pic_cpb_params_present_flag || rap_cpb_params_present_flag) { | |
|         initial_alt_cpb_removal_delay[ i ] | u(v) |
|         initial_alt_cpb_removal_offset[ i ] | u(v) |
|       } | |
|       if( rap_cpb_params_present_flag ) | |
|         cpb_delay_offset[ i ] | u(v) |
|     } | |
|   } | |
| } | |

A buffering period supplemental enhancement information (SEI) message provides initial CPB removal delay and initial CPB removal delay offset information for initialization of the HRD at the position of the associated access unit in decoding order.

The following applies for the buffering period SEI message syntax and semantics. First, the syntax elements initial_cpb_removal_delay_length_minus 1, au_cpb_removal_delay_length_minus1, and sub_pic_cpb_params_present_flag, and the variables NalHrdBpPresentFlag and VclHrdBpPresentFlag, are found in or derived at, e.g., video decoder 30, from syntax elements in the hrd_parameters( ) syntax structure that is applicable to at least one of the operation points to which the buffering period SEI message applies. Second, the variables CpbSize[i], BitRate[i] and CpbCnt are derived at, e.g., video decoder 30, from syntax elements found in the sub_layer_hrd_parameters( ) syntax structure that is applicable to at least one of the operation points to which the buffering period SEI message applies. Third, any two operation points to which the buffering period SEI message applies having different OpTid values tIdA and tIdB indicate that the values of cpb_cnt_minus1[tIdA] and cpb_cnt_minus1[tIdB] coded in the hrd_parameters( ) syntax structure(s) applicable to the two operation points are identical. Fourth, any two operation points to which the buffering period SEI message applies having different OpLayerIdSet values layerIdSetA and layerIdSetB indicate that the values of nal_hrd_parameters_present_flag and vcl_hrd_parameters_present_flag, respectively, for the two hrd_parameters( ) syntax structures applicable to the two operation points are identical. Finally, the bitstream (or a part thereof) refers to the bitstream subset (or a part thereof) associated with any of the operation points to which the buffering period SEI message applies.

If the syntax elements NalHrdBpPresentFlag or VclHrdBpPresentFlag are equal to 1, a buffering period SEI message applicable to the specified operation points may be associated with any access unit in the coded video sequence, and a buffering period SEI message applicable to the specified operation points shall be associated with each RAP access unit, with each access unit associated with a recovery point SEI message. Otherwise (NalHrdBpPresentFlag and VclHrdBpPresentFlag are both equal to 0), in this example, no access unit in the coded video sequence shall be associated with a buffering period SEI message applicable to the specified operation points.

For some applications, frequent presence of buffering period SEI messages may be desirable.

When an SEI NAL unit that contains a buffering period SEI message and has nuh_reserved_zero_6bits equal to 0 is present, the SEI NAL unit shall precede, in decoding order, the first VCL NAL unit in the access unit.

The syntax element bp_seq_parameter_set_id specifies the sps_seq_parameter_set_id for the sequence parameter set that is active for the coded picture associated with the buffering period SEI message. The value of bp_seq_parameter_set_id shall be equal to the value of pps_seq_parameter_set_id in the picture parameter set referenced by the slice_pic_parameter_set_id of the slice segment headers of the coded picture associated with the buffering period SEI message. The value of bp_seq_parameter_set_id shall be in the range of 0 to 15, inclusive.

The syntax element rap_cpb_params_present_flag equal to 1 specifies the presence of the initial_alt_cpb_removal_delay[i] and initial_alt_cpb_removal_offset[i] syntax elements. When not present, the value of rap_cpb_params_present_flag is inferred to be equal to 0. When the associated picture is neither a CRA picture nor a BLA picture, the value of rap_cpb_params_present_flag shall be equal to 0.

The syntax element initial_cpb_removal_delay[i] and initial_alt_cpb_removal_delay[i] specify the default and the alternative initial CPB removal delays, respectively, for the i-th CPB. The syntax elements have a length in bits given by initial_cpb_removal_delay_length_minus1+1, and are in units of a 90 kHz clock. The values of the syntax elements shall not be equal to 0 and shall be less than or equal to 90000*(CpbSize[i]÷BitRate[i]), the time-equivalent of the CPB size in 90 kHz clock units.

The syntax element initial_cpb_removal_offset[i] and initial_alt_cpb_removal_offset[i] specify the default and the alternative initial CPB removal offsets, respectively, for the i-th CPB to specify the initial delivery time of coded data units to the CPB. The syntax elements have a length in bits given by initial_cpb_removal_delay_length_minus1+1 and are in units of a 90 kHz clock.

Over the entire coded video sequence, the sum of initial_cpb_removal_delay[i] and initial_cpb_removal_offset[i] shall be constant for each value of i, and the sum of initial_alt_cpb_removal_delay[i] and initial_alt_cpb_removal_offset[i] shall be constant for each value of i.

The syntax element cpb_delay_offset[i] specifies, for the i-th CPB, an offset to be used in derivation of the nominal CPB removal times of access units following, in decoding order, the CRA or BLA access unit associated with the buffering period SEI message when the RASL access units associated with the CRA or BLA access unit are not present. The syntax element has a length in bits given by au_cpb_removal_delay_length_minus1+1 and is in units of a 90 kHz clock.

In some examples, video encoders 20 are recommended not to include initial_alt_cpb_removal_delay[i], initial_alt_cpb_removal_offset[i], and cpb_delay_offset[i] in buffering period SEI messages associated with CRA or BLA pictures that have associated RASL and RADL pictures that are interleaved in decoding order.

The next section will discuss the timing of decoding unit removal and decoding of decoding units. The variables InitCpbRemovalDelay[SchedSelIdx], InitCpbRemovalDelayOffset[SchedSelIdx], and cpbDelayOffset[SchedSelIdx] are derived as follows. First, if one or more of condition (A) and condition (B) presented below are true, InitCpbRemovalDelay[SchedSelIdx], InitCpbRemovalDelayOffset[SchedSelIdx], and cpbDelayOffset[SchedSelIdx] are set equal to the values of the buffering period SEI message syntax elements initial_alt_cpb_removal_delay[SchedSelIdx], initial_alt_cpb_removal_offset[SchedSelIdx], and cpb_delay_offset[SchedSelIdx], respectively, which are selected depending on NalHrdModeFlag as specified in subclause C.1 of HEVC WD9. Condition (A) is that access unit 0 is a BLA access unit for which the coded picture has nal_unit_type equal to BLA_W_DLP or BLA_N_LP, and the value of rap_cpb_params_present_flag of the buffering period SEI message is equal to 1. Condition (B) is that access unit 0 is a BLA access unit for which the coded picture has nal_unit_type equal to BLA_W_LP or is a CRA access unit, and the value of rap_cpb_params_present_flag of the buffering period SEI message is equal to 1, and one or more of the following conditions are true: (1) UseAltCpbParamsFlag for access unit 0 is equal to 1. DefaultInitCpbParamsFlag is equal to 0, (2) otherwise, InitCpbRemovalDelay[SchedSelIdx] and InitCpbRemovalDelayOffset[SchedSelIdx] are set equal to the values of the buffering period SEI message syntax elements initial_cpb_removal_delay[SchedSelIdx] and initial_cpb_removal_offset[SchedSelIdx], respectively, which are selected depending on NalHrdModeFlag as specified in subclause C.1, and cpbDelayOffset[SchedSelIdx] is set equal to 0.

The nominal removal time of the access unit n from the CPB is specified as follows. First, if access unit n is the access unit with n being equal to 0 (the access unit that initializes the HRD), the nominal removal time of the access unit from the CPB is specified by:

NominalRemovalTime(0)=InitCpbRemovalDelay [SchedSelIdx]/90000 (C-9)

Otherwise, when access unit n is the first access unit of a buffering period that does not initialize the HRD, the following applies. The nominal removal time of the access unit n from the CPB is specified by:

NominalRemovalTime(n)=NominalRemovalTime (firstPicInPrevBuffPeriod)+ClockTick*((AuCpbRemovalDelayVal(n))−cpbDelayOffset[SchedSelIdx]) (C-10)

where NominalRemovalTime(firstPicInPrevBuffPeriod) is the nominal removal time of the first access unit of the previous buffering period, and AuCpbRemovalDelayVal(n) is the value of AuCpbRemovalDelayVal derived according to the au_cpb_removal_delay_minus1 in the picture timing SEI message, selected as specified in subclause C.1, associated with access unit n.

After the derivation of the nominal CPB removal time of access unit n, the value of cpbDelayOffset[SchedSelIdx] is updated as follows. If one or more of the following conditions are true, cpbDelayOffset[SchedSelIdx] is set equal to the value of the buffering period SEI message syntax element cpb_removal_delay_offset[SchedSelIdx], selected depending on NalHrdModeFlag as specified in subclause C.1 of HEVC WD9. Access unit n is a BLA access unit for which the coded picture has nal_unit_type equal to BLA_W_DLP or BLA_N_LP, and the value of rap_cpb_params_present_flag of the buffering period SEI message is equal to 1. Access unit n is a BLA access unit for which the coded picture has nal_unit_type equal to BLA_W_LP or is a CRA access unit, and the value of rap_cpb_params_present_flag of the buffering period SEI message is equal to 1, and UseAltCpbParamsFlag for access unit n is equal to 1. Otherwise, cpbDelayOffset[SchedSelIdx] is set equal to 0. When access unit n is not the first access unit of a buffering period, the nominal removal time of the access unit n from the CPB is specified by:

NominalRemovalTime(n)=NominalRemovalTime (firstPicInCurrBuffPeriod)+ClockTick*((AuCpbRemovalDelayVal(n))−cpbDelayOffset[SchedSelIDx]) (C-11)

where NominalRemovalTime(firstPicInCurrBuffPeriod) is the nominal removal time of the first access unit of the current buffering period.

When sub_pic_cpb_params_present_flag is equal to 1, the following applies. The variable cpbRemovalDelayInc(m) is derived as follows. If sub_pic_cpb_params_in_pic_timing_sei_flag is equal to 0, the variable cpbRemovalDelayInc(m) is set to the value of du_spt_cpb_removal_delay_increment in the decoding unit information SEI message, selected as specified in subclause C.1, associated with decoding unit m. Otherwise, if du_common_cpb_removal_delay_flag is equal to 0, the variable cpbRemovalDelayInc(m) is set to the value of: du_cpb_removal_delay_increment_minus1 [i]+1 for decoding unit m in the picture timing SEI message, selected as specified in subclause C.1, associated with access unit n, where the value of i is 0 for the first num_nalus_in_du_minus1[0]+1 consecutive NAL units in the access unit that contains decoding unit m, 1 for the subsequent num_nalus_in_du_minus1[1]+1 NAL units in the same access unit, 2 for the subsequent num_nalus_in_du_minus1 [2]+1 NAL units in the same access unit, etc. Otherwise, the variable cpbRemovalDelayInc(m) is set to the value of du_common_cpb_removal_delay_increment_minus1+1 in the picture timing SEI message, selected as specified in subclause C.1, associated with access unit n. The nominal removal time of decoding unit m from the CPB is specified as follows, where NominalRemovalTime(n) is the nominal removal time of access unit n. If decoding unit m is the last decoding unit in access unit n, the nominal removal time of decoding unit m NominalRemovalTime(m) is set to NominalRemovalTime(n). Otherwise, (i.e. decoding unit m is not the last decoding unit in access unit n), the nominal removal time of decoding unit m NominalRemovalTime(m) is derived as follows.

---
If( sub_pic_cpb_params_in_pic_timing_sei_flag );
  NominalRemovalTime( m ) =
  NominalRemovalTime( m + 1 ) −ClockSubTick *
  cpbRemovalDelayInc( m ) (C-12)
else
  NominalRemovalTime( m ) = NominalRemovalTime( n ) −
  ClockSubTick * cpbRemovalDelayInc( m )
---

The removal time of access unit n from the CPB is specified as follows, where FinalArrivalTime(m) and NominalRemovalTime(m) are the final arrival time and nominal removal time, respectively, of the last decoding unit in access unit n, and FinalArrivalTime(n) and NominalRemovalTime(n) are the final arrival time and nominal removal time, respectively, of access unit n.

---
if( !low_delay_hrd_flag[ HighestTid ] | | NominalRemovalTime( n ) >= FinalArrivalTime( n ) )
  CpbRemovalTime( n ) = NominalRemovalTime( n )
else if( sub_pic_cpb_params_present_flag ) (C-13)
  CpbRemovalTime( n ) = NominalRemovalTime( n ) +
    Max( ( ClockSubTick * Ceil( ( FinalArrivalTime( m ) −
  NominalRemovalTime( m ) ) / ClockSubTick ) ),
  ( ClockTick * Ceil( ( FinalArrivalTime( n ) − NominalRemovalTime( n ) ) / ClockTick
  ) ) )
else
  CpbRemovalTime( n ) = NominalRemovalTime( n ) + ClockTick *
    Ceil( ( FinalArrivalTime( n ) − NominalRemovalTime( n ) ) / ClockTick )
---

When SubPicCpbFlag is equal to 1, the variable lastDuInAuFlag is set equal to 1 if decoding unit m is the last decoding unit of access unit n and 0 otherwise, and the removal time of decoding unit m from the CPB is specified as follows.

---
if( !low_delay_hrd_flag[ HighestTid ] | | NominalRemovalTime( m ) >= FinalArrivalTime( m ) )
  CpbRemovalTime( m ) = NominalRemovalTime( m )
else if( !lastDuInAuFlag ) (C-14)
  CpbRemovalTime( m ) = NominalRemovalTime( m ) + ClockSubTick *
    Ceil( ( FinalArrivalTime( m ) − NominalRemovalTime( m ) ) /
  ClockSubTick )
else
  CpbRemovalTime( m ) = CpbRemovalTime( n )
---

When low_delay_hrd_flag[HighestTid] is equal to 1 and NominalRemovalTime(m)<FinalArrivalTime(m), the size of decoding unit m is so large that it prevents removal at the nominal removal time. At the CPB removal time of decoding unit m, the decoding unit is instantaneously decoded. Picture n is considered as decoded when the last decoding unit of the picture is decoded. The changes described above may also be implemented by a video encoder 20, for example, to encode a bitstream using some or all aspects of the buffering period SEI message syntax and semantics and subclause C.2.3 of HEVC WD9 such that the bitstream may be decoded by video decoder 30.

Figure 4:
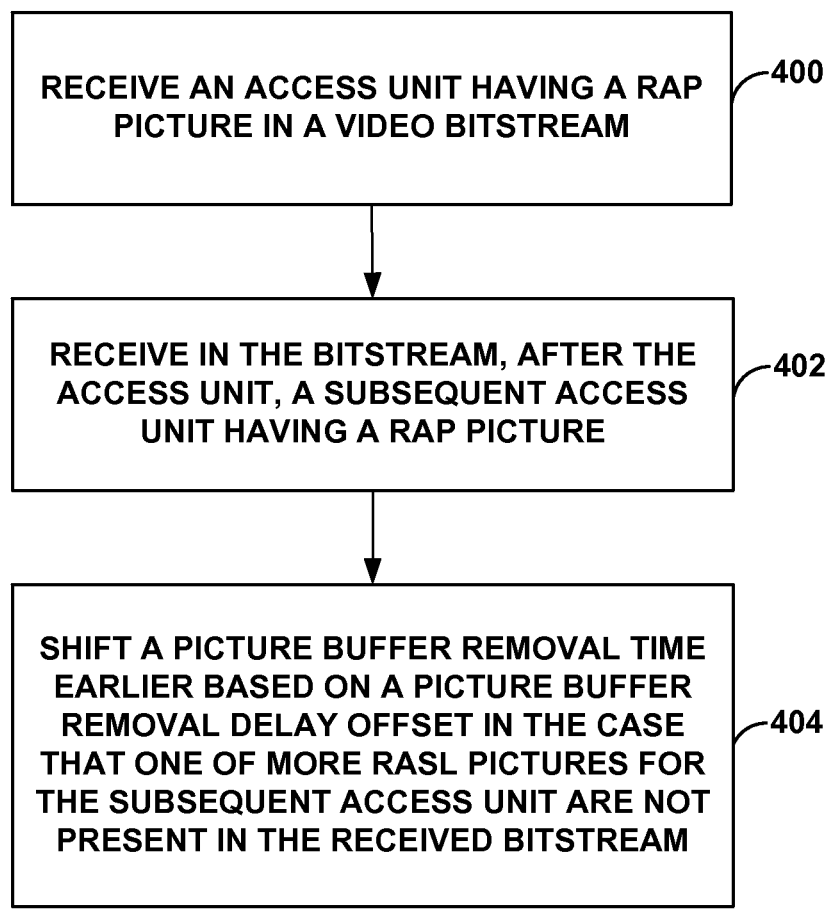
FIG. 4 is a flowchart illustrating an example method in accordance with one or more examples described in this disclosure.

FIG. 4 is a flowchart illustrating an example method in accordance with one or more examples described in this disclosure. Destination device 14 may implement a method of processing video data. For example, video decoder 30 may receive an access unit having a RAP picture in a video bitstream (400). Video decoder may also receive in the bitstream, after the access unit, a subsequent access unit having a RAP picture (402). In the case that one or more random access skipped leading (RASL) pictures for the subsequent access unit are not present in the received bitstream, shifting a picture buffer removal time earlier based on a picture buffer removal delay offset (404).

In some examples, the picture buffer includes a coded picture buffer (CPB) and the picture buffer removal delay offset includes a CPB removal delay offset. In other examples, the picture buffer includes a decoded picture buffer (DPB) and the picture buffer removal delay offset includes a DPB removal delay offset.

Video decoder 30 may receive the picture buffer removal delay offset for the access unit. In some examples, video decoder 30 may receive the picture buffer removal delay offset in a buffering period SEI message. In some examples, the RAP picture includes one of a clean random access (CRA) picture and a broken link access (BLA) picture.

Figure 5:
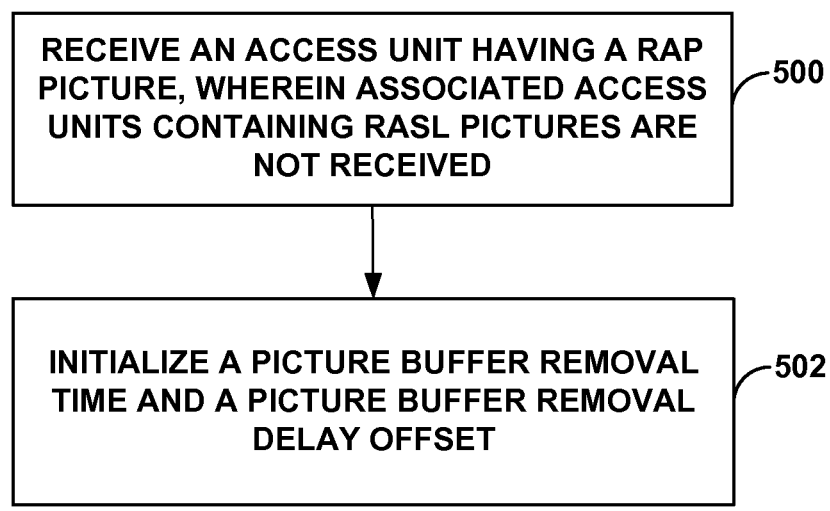
FIG. 5 is a flowchart illustrating an example method in accordance with one or more examples described in this disclosure.

FIG. 5 is a flowchart illustrating an example method in accordance with one or more examples described in this disclosure. Destination device 14 may implement a method of processing video data. For example, video decoder 30 may receive an access unit, e.g., after an earlier initialization, the access unit having a random access point (RAP) picture. This may be, for example, after a RAP access unit that initializes the HRD. The associated access units may contain random access skipped leading (RASL) pictures are not received (500). Video decoder 30 may initialize a picture buffer removal time and a picture buffer removal delay offset in response to receiving the access unit and not receiving the associated access units containing RASL pictures (502).

The picture buffer removal time includes a coded picture buffer (CPB) removal time and the picture buffer removal delay offset includes a CPB removal delay offset. The picture buffer removal time includes a decoded picture buffer (DPB) removal time and the picture buffer removal delay offset includes a DPB removal delay offset. In an example, video decoder 30 may receive the picture buffer removal delay offset in a buffering period SEI message.

In an example, the RAP picture is a clean random access (CRA) picture. In another example, the RAP picture is a broken link access (BLA) picture that may have associated RASL pictures or random access skipped decodable (RADL) pictures. The RAP picture is one of a broken link access (BLA) picture that does not have associated RASL pictures, but may have RADL pictures, and a BLA picture that does not have associated leading pictures. An example may further include designating the received access unit as the first access unit in a bitstream.

In another example method of processing video data a video coder such as video encoder 20 or video decoder 30 may signal a CPB removal delay offset for each CRA or BLA access unit. The video coder may also shift the CPB removal time of each of the access units following the CRA or BLA access unit in decoding order earlier by the CPB removal delay offset for each CRA or BLA access unit for which the associated RASL pictures are not present, regardless of whether the HRD initializes at the CRA or BLA access unit.

In another example method of processing video data the video coder may signaling a CPB removal delay offset for each CRA or BLA access unit. The video coder may also select the default initial CPB removal delay and delay offset for access unit 0 such that alternative initial CPB removal delay and delay offset are not signaled for CRA or BLA access units unless sub-picture level CPB parameters are present. In an example, the alternative initial CPB removal delay and delay offset may be for sub-picture level HRD operations.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
receiving, in a video bitstream, an access unit having a first random access point (RAP) picture;

receiving a subsequent access unit having a RAP picture that does not initialize a hypothetical reference decoder (HRD); and based on one or more random access skipped leading (RASL) pictures for the subsequent access unit not being present in the video bitstream, shifting a picture buffer removal time for a picture buffer earlier based on a picture buffer removal delay offset.

2. The method of claim 1, wherein the picture buffer comprises a coded picture buffer (CPB) and the picture buffer removal delay offset comprises a CPB removal delay offset.

3. The method of claim 2, wherein the CPB removal delay offset is signaled for the RAP picture of the subsequent access unit.

4. The method of claim 1, wherein the picture buffer comprises a decoded picture buffer (DPB) and the picture buffer removal delay offset comprises a DPB removal delay offset.

5. The method of claim 1, further comprising receiving the picture buffer removal delay offset for the subsequent access unit.

6. The method of claim 1, further comprising receiving the picture buffer removal delay offset in a buffering period supplemental enhancement information (SEI) message.

7. The method of claim 1, wherein the RAP picture includes one of a clean random access (CRA) picture and a broken link access (BLA) picture.

8. A method of processing video data, the method comprising:

receiving, in a video bitstream, an initial access unit having a random access point (RAP) picture that initializes a hypothetical reference decoder (HRD);

receiving, subsequent to the initial access unit, a subsequent access unit having a RAP picture;

determining that one or more random access skipped leading (RASL) pictures associated with the subsequent access unit were not received; and based on a determination that one or more RASL pictures associated with the subsequent access unit were not received, re-initializing the HRD, including re-initializing a picture buffer removal time and a picture buffer removal delay offset.

9. The method of claim 8, wherein the picture buffer removal time comprises a coded picture buffer (CPB) removal time and the picture buffer removal delay offset comprises a CPB removal delay offset.

10. The method of claim 9, wherein the CPB removal delay offset is signaled for the RAP picture of the subsequent access unit.

11. The method of claim 8, wherein the picture buffer removal time comprises a decoded picture buffer (DPB) removal time and the picture buffer removal delay offset comprises a DPB removal delay offset.

12. The method of claim 8, wherein the RAP picture is a clean random access (CRA) picture.

13. The method of claim 8, wherein the RAP picture is a broken link access (BLA) picture that includes one of associated RASL pictures or random access skipped decodable (RADL) pictures.

14. The method of claim 8, wherein the RAP picture is one of a broken link access (BLA) picture that does not have associated RASL pictures, but may have RADL pictures, and a BLA picture that does not have associated leading pictures.

15. The method of claim 8, further comprising processing the received initial access unit as a first access unit in a bitstream.

16. The method of claim 8, further comprising receiving the picture buffer removal delay offset in a buffering period supplemental enhancement information (SEI) message.

17. A device for processing video data comprising:

a picture buffer; and a processor in communication with the picture buffer, wherein the processor comprises an integrated circuit and is configured to:

receive in a video bitstream an initial access unit having a first random access point (RAP) picture that initializes a hypothetical reference decoder (HRD);

receive a subsequent access unit having a RAP picture that does not initialize the HRD; and based on one or more random access skipped leading (RASL) pictures for the subsequent access unit not being present in the received video bitstream, shift a picture buffer removal time for the picture buffer earlier based on a picture buffer removal delay offset.

18. The device of claim 17, wherein the picture buffer comprises a coded picture buffer (CPB) and the picture buffer removal delay offset comprises a CPB removal delay offset.

19. The device of claim 18, wherein the CPB removal delay offset is signaled for the RAP picture of the subsequent access unit.

20. The device of claim 17, wherein the picture buffer comprises a decoded picture buffer (DPB) and the picture buffer removal delay offset comprises a DPB removal delay offset.

21. The device of claim 17, wherein the processor is further configured to receive the picture buffer removal delay offset for the access unit.

22. The device of claim 17, wherein the processor is further configured to receive the picture buffer removal delay offset in a buffering period supplemental enhancement information (SEI) message.

23. The device of claim 17, wherein the RAP picture includes one of a clean random access (CRA) picture and a broken link access (BLA) picture.

24. A device for processing video data comprising:

an input interface, wherein the input interface receives a video bitstream;

memory; and a processor in communication with the memory and the input interface, wherein the processor comprises an integrated circuit and wherein the processor is configured to:

receive, in the video bitstream, an initial access unit having a random access point (RAP) picture that initializes a hypothetical reference decoder (HRD);

receive, subsequent to the initial access unit, a subsequent access unit having a RAP picture;

determine that one or more random access skipped leading (RASL) pictures associated with the subsequent access unit were not received; and based on a determination that one or more random access skipped leading (RASL) pictures associated with the subsequent access unit were not received, re-initialize the HRD, including re-initializing a picture buffer removal time and a picture buffer removal delay offset.

25. The device of claim 24, wherein the picture buffer removal time comprises a coded picture buffer (CPB) removal time and the picture buffer removal delay offset comprises a CPB removal delay offset.

26. The device of claim 25, wherein the CPB removal delay offset is signaled for the RAP picture of the subsequent access unit.

27. The device of claim 24, wherein the picture buffer removal time comprises a decoded picture buffer (DPB) removal time and the picture buffer removal delay offset comprises a DPB removal delay offset.

28. The device of claim 24, wherein the RAP picture is a clean random access (CRA) picture.

29. The device of claim 24, wherein the RAP picture is a broken link access (BLA) picture that includes one of associated RASL pictures or random access skipped decodable (RADL) pictures.

30. The device of claim 24, wherein the RAP picture is one of a broken link access (BLA) picture that does not have associated RASL pictures, but may have RADL pictures, and a BLA picture that does not have associated leading pictures.

31. The device of claim 24, wherein the processor is further configured to designate the received initial access unit as the first access unit in a bitstream.

32. The device of claim 24, wherein the processor is further configured to receive the picture buffer removal delay offset in a buffering period supplemental enhancement information (SEI) message.

33. A device for processing video data comprising:
means for receiving, in a video bitstream, an initial access unit having a random access point (RAP) picture that initializes a hypothetical reference decoder (HRD);
means for receiving, a subsequent access unit having a RAP picture that does not initialize the HRD; and
means for shifting a picture buffer removal time for a picture buffer earlier based on a picture buffer removal delay offset when one or more random access skipped leading (RASL) pictures associated with the subsequent access unit are not present in the received video bitstream.

34. The device of claim 33, wherein the picture buffer comprises a coded picture buffer (CPB) and the picture buffer removal delay offset comprises a CPB removal delay offset.

35. The device of claim 33, wherein the picture buffer comprises a decoded picture buffer (DPB) and the picture buffer removal delay offset comprises a DPB removal delay offset.

36. The device of claim 33, further comprising means for receiving the picture buffer removal delay offset for the subsequent access unit.

37. The device of claim 33, further comprising receiving the picture buffer removal delay offset in a buffering period supplemental enhancement information (SEI) message.

38. The device of claim 33, wherein the RAP picture includes one of a clean random access (CRA) picture and a broken link access (BLA) picture.

39. A device for processing video data comprising:
means for receiving, in a video bitstream, an initial access unit having a random access point (RAP) picture that initializes a hypothetical reference decoder (HRD);
means for determining that one or more random access skipped leading (RASL) pictures associated with a subsequent access unit were not received; and
means for re-initializing the HRD when one or more RASL pictures associated with the subsequent access unit were not received, wherein the means for re-initializing includes means for re-initializing a picture buffer removal time and means for re-initializing a picture buffer removal delay offset.

40. The device of claim 39, wherein the picture buffer removal time comprises a coded picture buffer (CPB) removal time and the picture buffer removal delay offset comprises a CPB removal delay offset.

41. The device of claim 39, wherein the picture buffer removal time comprises a decoded picture buffer (DPB) removal time and the picture buffer removal delay offset comprises a DPB removal delay offset.

42. The device of claim 39, wherein the RAP picture is a clean random access (CRA) picture.

43. The device of claim 39, wherein the RAP picture is a broken link access (BLA) picture that includes one of associated RASL pictures or random access skipped decodable (RADL) pictures.

44. The device of claim 39, wherein the RAP picture is one of a broken link access (BLA) picture that does not have associated RASL pictures, but may have RADL pictures, and a BLA picture that does not have associated leading pictures.

45. The device of claim 39, further comprising means for processing the received initial access unit as the first access unit in a bitstream.

46. The device of claim 39, further comprising receiving the picture buffer removal delay offset in a buffering period supplemental enhancement information (SEI) message.

47. A non-transitory computer readable storage medium storing instructions that upon execution by one or more processors cause the one or more processors to:
receive, in a video bitstream, an initial access unit having a random access point (RAP) picture that initializes a hypothetical reference decoder (HRD);
receive, in the video bitstream, after the initial access unit in the bitstream, a subsequent access unit having a RAP picture that does not initialize the HRD; and
shift a picture buffer removal time for a picture buffer earlier based on a picture buffer removal delay offset when one or more random access skipped leading (RASL) pictures associated with the subsequent access unit are not present in the received video bitstream.

48. A non-transitory computer readable storage medium storing instructions that upon execution by one or more processors cause the one or more processors to:
receive, in a video bitstream, an initial access unit having a random access point (RAP) picture that initializes a hypothetical reference decoder (HRD); receive, subsequent to the initial access unit, a subsequent access unit having a RAP picture;
determine that one or more random access skipped leading (RASL) pictures associated with the subsequent access unit were not received; and
based on a determination that one or more RASL pictures associated with the subsequent access unit were not received, re-initialize the HRD, including re-initializing a picture buffer removal time and re-initializing a picture buffer removal delay offset.

49. A method of processing video data comprising:
signaling a coded picture buffer (CPB) removal delay offset for each clean random access (CRA) or broken link access (BLA) access unit;
determining if one or more random access skipped leading (RASL) pictures associated with one of the CRA access units or with one of the BLA access units were not received; and
if one or more random access skipped leading (RASL) pictures associated with one of the CRA access units or with one of the BLA access units were not received, shifting a CPB removal time of each of the access units following the CRA or BLA access unit in decoding order earlier by the CPB removal delay offset for each CRA or BLA access unit for which the associated RASL pictures are not present.

50. The method of claim 1, further comprising shifting the picture buffer removal time for the picture buffer earlier based on an accumulation of respective picture buffer removal delay offsets for the access units, subsequent to the initial access unit, having RAP pictures that respectively do not initialize the HRD.

51. The method of claim 1, further comprising shifting the picture buffer removal time for the picture buffer earlier based on respective picture buffer removal delay offsets for both the subsequent access unit having the RAP picture that does not initialize the HRD and the initial access unit having the RAP picture that initializes the HRD.

52. The device of claim 17, wherein the processor is further configured to shift the picture buffer removal time for the picture buffer earlier based on an accumulation of respective picture buffer removal delay offsets for the access unit, subsequent to the initial access units, having RAP pictures that respectively do not initialize the HRD.

53. The device of claim 17, wherein the processor is further configured to shift the picture buffer removal time for the picture buffer earlier based on respective picture buffer removal delay offsets for both the subsequent access unit having the RAP picture that does not initialize the HRD and the initial access unit having the RAP picture that initializes the HRD.

54. The device of claim 33, further comprising means for shifting the picture buffer removal time for the picture buffer earlier based on an accumulation of respective picture buffer removal delay offsets for the access units, subsequent to the initial access unit, having RAP pictures that respectively do not initialize the HRD.

55. The device of claim 33, further comprising means for shifting the picture buffer removal time for the picture buffer earlier based on respective picture buffer removal delay offsets for both the subsequent access unit having the RAP picture that does not initialize the HRD and the initial access unit having the RAP picture that initializes the HRD.

* * * * *